United States Patent
Matsumura et al.

(10) Patent No.: US 6,727,909 B1
(45) Date of Patent: Apr. 27, 2004

(54) IMAGE EDITING APPARATUS AND METHOD AND MEDIUM ON WHICH PROGRAMS ARE RECORDED

(75) Inventors: Koichi Matsumura, Kawasaki (JP); Shigeki Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/025,746

(22) Filed: Feb. 18, 1998

(30) Foreign Application Priority Data

Feb. 19, 1997 (JP) .............................. 9-035097
Feb. 19, 1997 (JP) .............................. 9-035127

(51) Int. Cl.$^7$ ................................ G09G 5/14
(52) U.S. Cl. ...................... 345/629; 345/635
(58) Field of Search ................ 345/629–641, 345/647–661, 650, 561, 788–802; 348/584, 716; 382/216–220; 715/517

(56) References Cited

U.S. PATENT DOCUMENTS

| | | | | |
|---|---|---|---|---|
| 4,992,781 A | * | 2/1991 | Iwasaki et al. | 345/640 |
| 5,254,979 A | * | 10/1993 | Trevett et al. | 345/639 |
| 5,430,832 A | | 7/1995 | Imaizunori et al. | 395/134 |
| 6,323,877 B1 | * | 11/2001 | Katoh et al. | 345/638 |

FOREIGN PATENT DOCUMENTS

| | | | | |
|---|---|---|---|---|
| EP | 0 528 084 A1 | * | 8/1991 | 15/40 |
| EP | 0528084 | | 2/1993 | G06F/15/40 |
| EP | 0784294 | | 7/1997 | G06T/11/60 |
| EP | 0 784 294 A2 | * | 7/1997 | 11/60 |

OTHER PUBLICATIONS

Oh et al, non–patent literature "Image–Based Modeling and Photo Editing", ACM, Aug. 2001, pp. 433–442.*
Lee et al., non–patent literature "Computer Image Retrieval By Features: Suspect Identification", ACM, 1993, pp. 494–499.*

* cited by examiner

Primary Examiner—Matthew Luu
Assistant Examiner—Thu-Thao Havan
(74) Attorney, Agent, or Firm—Fitzpatrick, Cella, Harper & Scinto

(57) ABSTRACT

An image editing apparatus for laying out images input by an image input device includes a layout device for laying out a plurality of images within one page, and an evaluation unit for evaluating the layout result obtained by the layout unit. In addition, an image editing apparatus for laying out images input by an image input unit includes an effect designation unit for designating an arbitrary effect from at least one effect registered in advance, a condition setting unit for automatically setting layout conditions for the images on the basis of the condition designated by the effect designation unit, and a layout unit for laying out the images on the basis of the layout conditions set by the condition setting unit.

6 Claims, 20 Drawing Sheets

FIG.19

| | IMAGE OVERLAPPING EFFECT | DROP SHADOW EFFECT | BACKGROUND IMAGE EFFECT | CENTERING | LAYOUT SIZE |
|---|---|---|---|---|---|
| TEMPLATE 1 | × | × | × | × | Rtp |
| TEMPLATE 2 | ○ | × | × | × | Rov |
| TEMPLATE 3 | × | ○ | × | × | Rds |
| TEMPLATE 4 | × | × | ○ | ○ | Rbk |

IMAGE EDITING APPARATUS AND METHOD AND MEDIUM ON WHICH PROGRAMS ARE RECORDED

BACKGROUND OF THE INVENTION

The present invention relates to an image editing apparatus and method, such as an electronic album system, which output digital images, e.g., photographs, graphic patterns, and characters, upon laying out them in a desired form.

In a conventional system, when, for example, image layout/edit processing is to be performed on a computer, the operator prepares a slot for the insertion of an image on a page displayed on the screen first, and then flows the image into the slot. When layout/edit processing is to be performed for a plurality of images, the operator arranges a plurality of slots and determines the positions and sizes of the slots by skillfully operating a mouse and a keyboard.

In the above conventional system, however, the operator must adjust the positions and sizes of the slots by operating the mouse and the keyboard while visually checking them so as to neatly arrange the images within the page. This requires cumbersome operations and advanced skills.

SUMMARY OF THE INVENTION

The present invention has been made to solve these problems posed in the above conventional technique, and has as an object to provide an image layout apparatus and method, in an image editing apparatus for laying out images input by an image input means or the like, which can neatly and easily lay out images within a page.

It is another object of the present invention to provide an image editing apparatus for laying out images input by an image input means or the like, which can attractively lay out images without complicating the operation performed by an operator and producing any monotonous layout result.

According to the present invention, there is provided an image editing apparatus for laying out images input by image input means, comprising layout means for laying out a plurality of images in one page, and evaluation means for evaluating the layout result obtained by the layout means.

In addition, according to the present invention, there is provided an image editing apparatus for laying out images input by image input means, comprising effect designation means for designating an arbitrary effect from at least one effect registered in advance, condition setting means for automatically setting a layout condition for the images on the basis of the effect designated by the effect designation means, and layout means for laying out the images on the basis of the layout condition set by the condition setting means.

Other objects, features, and advantages of the present invention will become clear from the description thereof in the following specification and the accompanying drawings.

BRIEF DESCRIPTION OF THE DRAWINGS

FIG. 19 is a view showing a template in an eighth embodiment of the present invention.

DETAILED DESCRIPTION OF THE PREFERRED EMBODIMENTS

Embodiments of the present invention will be described in detail below with reference to the accompanying drawings.

First Embodiment

The first embodiment of the present invention will be described first. This embodiment exemplifies an apparatus designed to automatically form an album by using images read from a film.

Figure 1:
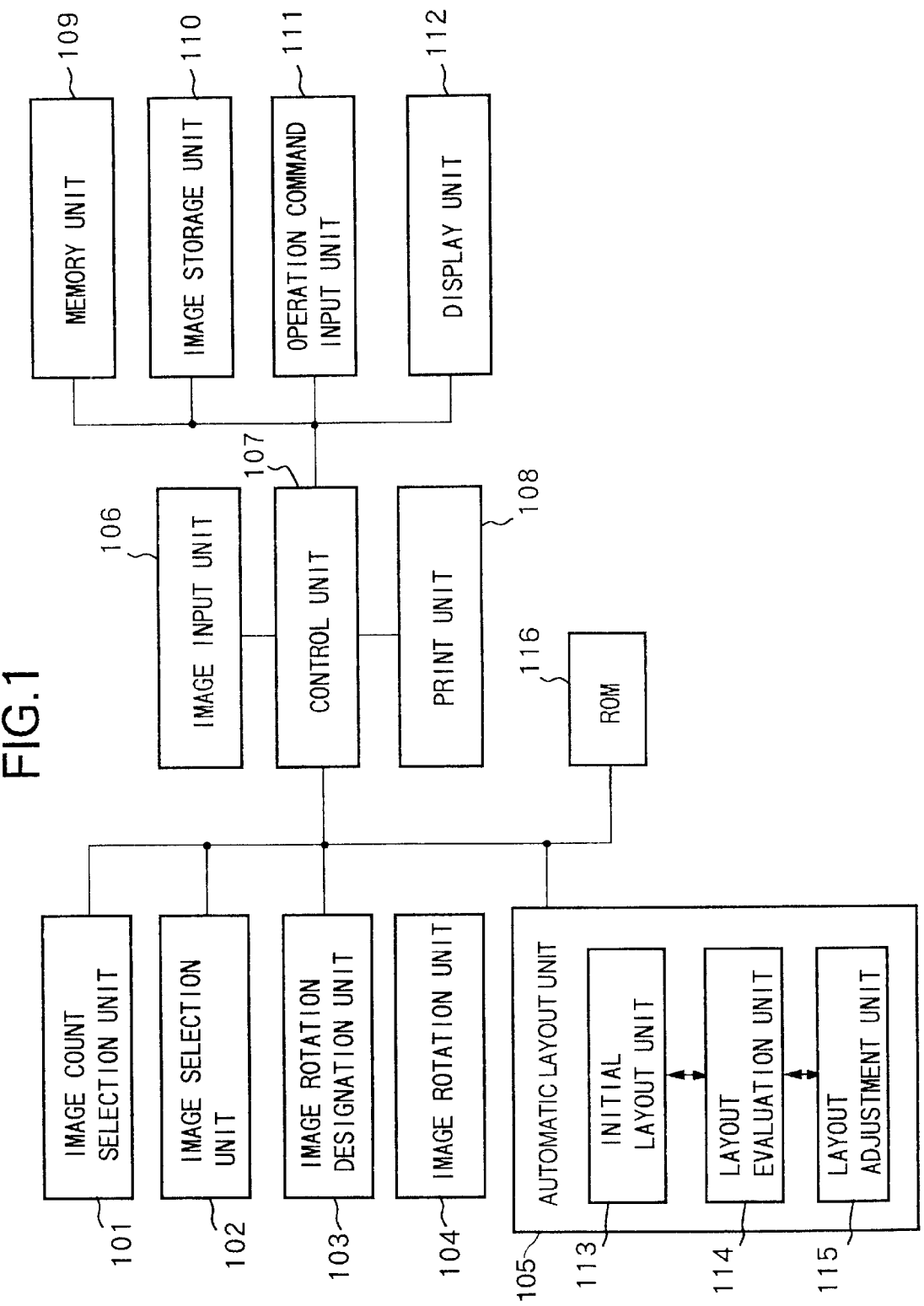
FIG. 1 is a block diagram showing the arrangement of an image layout apparatus according to an embodiment of the present invention.

FIG. 1 is a block diagram showing the arrangement of an image layout apparatus according to the first embodiment of the present invention. Reference numeral 101 denotes an image count selection unit for designating the number of images to be laid out in one page by using a keyboard or mouse connected to an operation command input unit 111.

Reference numeral 102 denotes an image selection unit for designating images to select the images to be laid out by using the keyboard or mouse connected to the operation command input unit 111; and 103, an image rotation designation unit for designating rotation of an arbitrary image, of the images selected by the image selection unit 102, in 90-degree increments by using the keyboard or mouse connected to the operation command input unit 111.

Reference numeral 104 denotes an image rotation unit for rotating an image in accordance with a command from the image rotation designation unit 103; and 105, an automatic layout unit for automatically laying out the number of images designated by the image count selection unit 101 after rotation processing is performed by the image rotation unit 104. The automatic layout unit 105 is constituted by an initial layout unit 113, a layout evaluation unit 114, a layout adjustment unit 115, and the like. Reference numeral 106 denotes an image input unit for inputting images from an image input device such as a film scanner or flatbed scanner.

Reference numeral 107 denotes a control unit which is constituted by a CPU (Central Processing Unit) and the like and performs overall control on all the constituent elements of this embodiment; and 108, a print unit for printing a layout result on a print sheet or a photographic film. The print unit 108 has the function of printing characters and images as sets of dots like a color ink-jet printer, a laser printer, or a film writer. Reference numeral 109 denotes a memory unit which is a memory device such as a memory for storing data necessary for various types of processing; and 110, an image storage unit for storing the image input by the image input unit 106. As the image storage unit 110, a storage device such as a hard disk, an MO, a ZIP, or a PD can be used.

The operation command input unit 111 is used to input characters and numbers by using the keyboard or select a command or image by using a pointing device such as a mouse. Reference numeral 112 denotes a display unit for displaying a layout process or result on the screen of a monitor such as a CRT to allow the operator to recognize the process or result in real time; and 116, a ROM in which control programs for the control unit 107, the automatic layout unit 105, and the like are stored.

The flow of processing to be controlled in accordance with the control programs stored in the ROM 116 in the image layout apparatus having the above arrangement according to this embodiment will be described next with reference to FIG. 2.

In step S201, a template is selected. Templates correspond to cardboard of an album. The templates include a template which is colored entirely, a template which has pictures and graphic patterns on the background, and the like. A plurality of types of such templates are prepared in advance. The operator selects a desired template from these prepared templates (sample templates).

Figure 3:
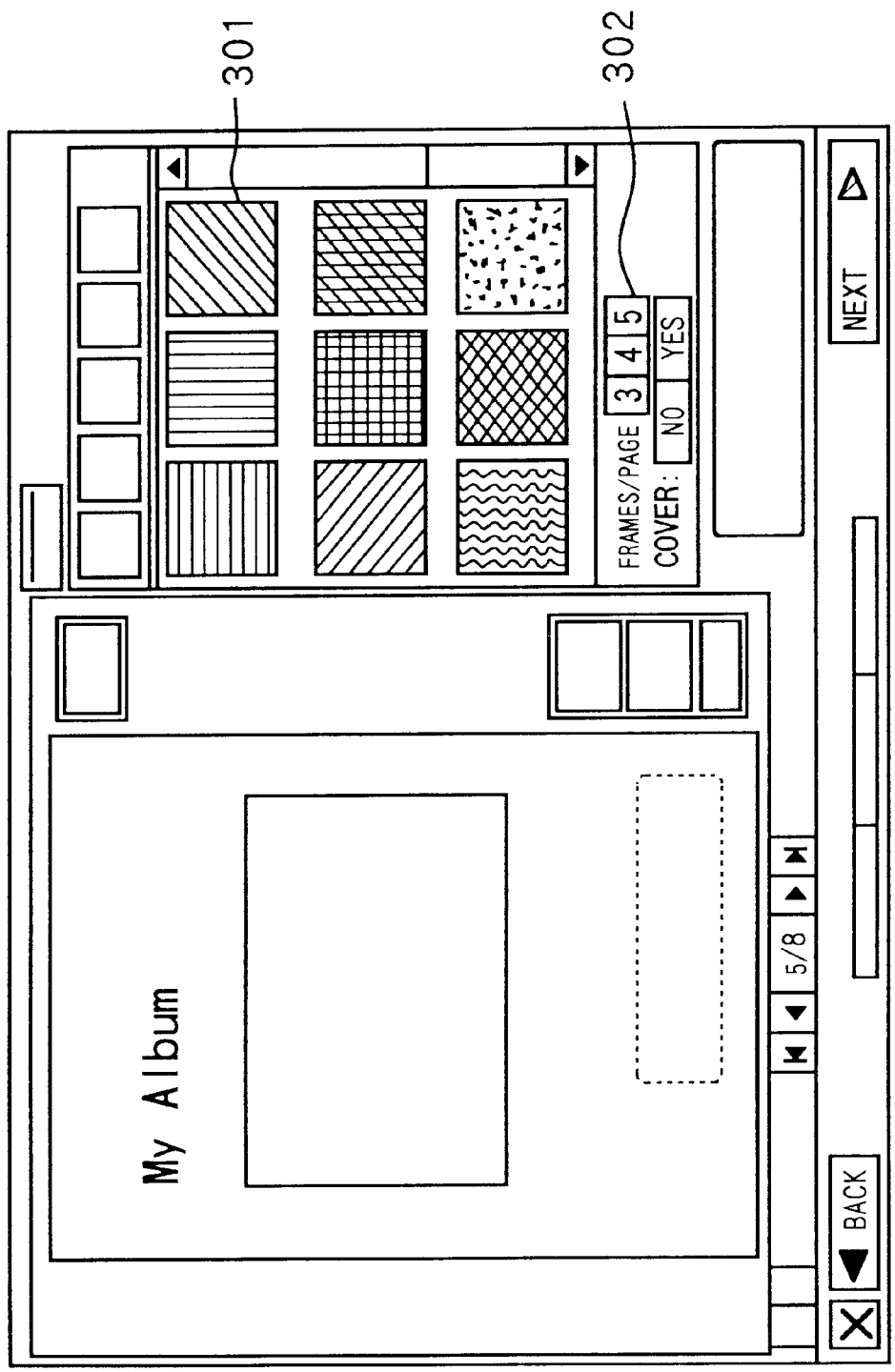
FIG. 3 is a view showing an example of a window for selecting a template and the number of images to be laid out per page in the embodiment.

FIG. 3 shows the display unit 112 and a window for selecting a template by using the operation command input unit 111. The operator selects an arbitrary template from a plurality of sample templates 301 shown on the right side of the window in FIG. 3. As the initial setting, one predetermined template is selected.

When a template is selected in this manner, the number of images to be displayed in one page is selected in step S202. The operator selects one of buttons "3", "4", and "5" of a Frame/Page button set 302. As the initial setting, button "3" is selected in advance.

In step S203, the images used for layout processing are selected. Assume that images have been input by the image input unit 106 in FIG. 1, and a plurality of images are stored in the image storage unit 110 before the flow advances to step S203.

Figure 4:
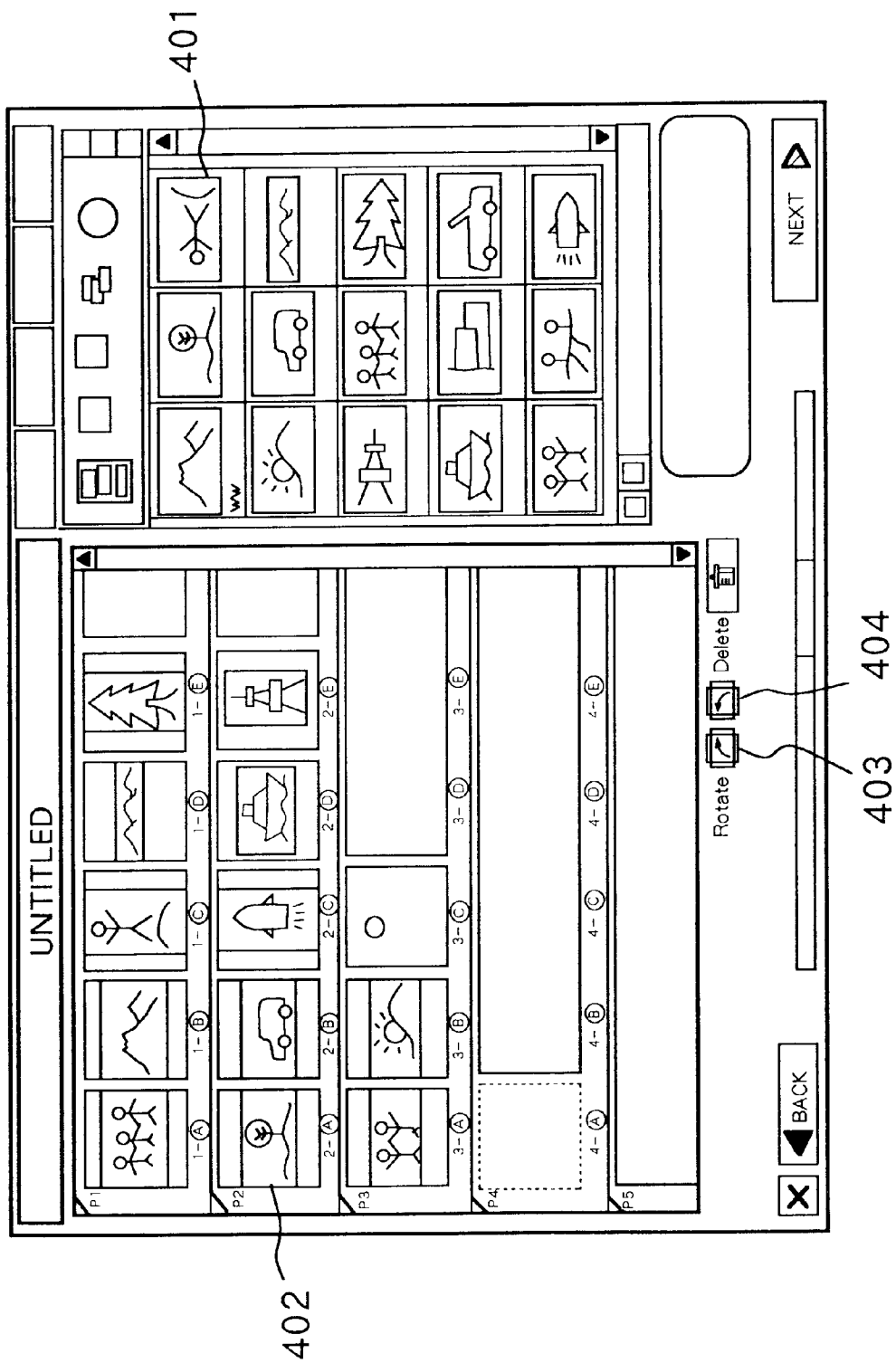
FIG. 4 is a view showing an example of a window for selecting the images to be used for layout processing in the embodiment.

FIG. 4 shows a window for selecting images. Referring to FIG. 4, a window 401 shown on the right side is called an image list window, in which a list of images input in the image storage unit 110 in advance are displayed as images. A window 402 shown on the left side is called an image selection window, in which the images to be laid out, selected from the image list window, are displayed.

One line of the image selection window corresponds to one page. That is, the five images arranged on one line of the image selection window in FIG. 4 are automatically laid out in one page of the template (album) sequentially from the left end. Similarly, the second line corresponds to the second page. Referring to FIG. 4, since only two images are arranged on the third line, only the two images are automatically laid out in the third page.

The operator selects an arbitrary image from the image list window on the right side by using the mouse, and moves the image to the image selection window on the left side by dragging and dropping (dragging the image and releasing it in a desired place). With this operation, the operator can place the image at an arbitrary position in an arbitrary page.

In step S204, the sequence of the images to be arranged is changed by automatic layout processing (to be described later). In the image selection window in FIG. 4, the operator can move any image to an arbitrary position with the mouse by dragging and dropping.

With the above processing, the images to be stored in each page of the template and the sequence of the images are determined. In step S205, an image rotation command is input. The images arranged in the image selection window 402 in FIG. 4 include images photographed in portrait orientation and images photographed in landscape orientation. Of these images, an image with an improper orientation must be rotated through 90° clockwise or counterclockwise. As indicated by the middle lower portion in FIG. 4, a button 403 for rotating an image trough 90° clockwise and a button 404 for rotating an image through 90° counterclockwise are displayed on the display unit 112 under the control of the control unit 107. The operator selects the image to be rotated from the images displayed in the image selection window by clicking on it with the mouse. The operator then selects the clockwise or counterclockwise rotation button with the mouse to rotate the display image. The result is quickly displayed in the image selection window.

In step S206, automatic layout processing is performed by the automatic layout unit 105. The images displayed in the image selection window 402 in FIG. 4 are automatically laid out. As described with reference to step S203, the images arranged on one line of the image selection window are automatically laid out in one page.

Figure 5:
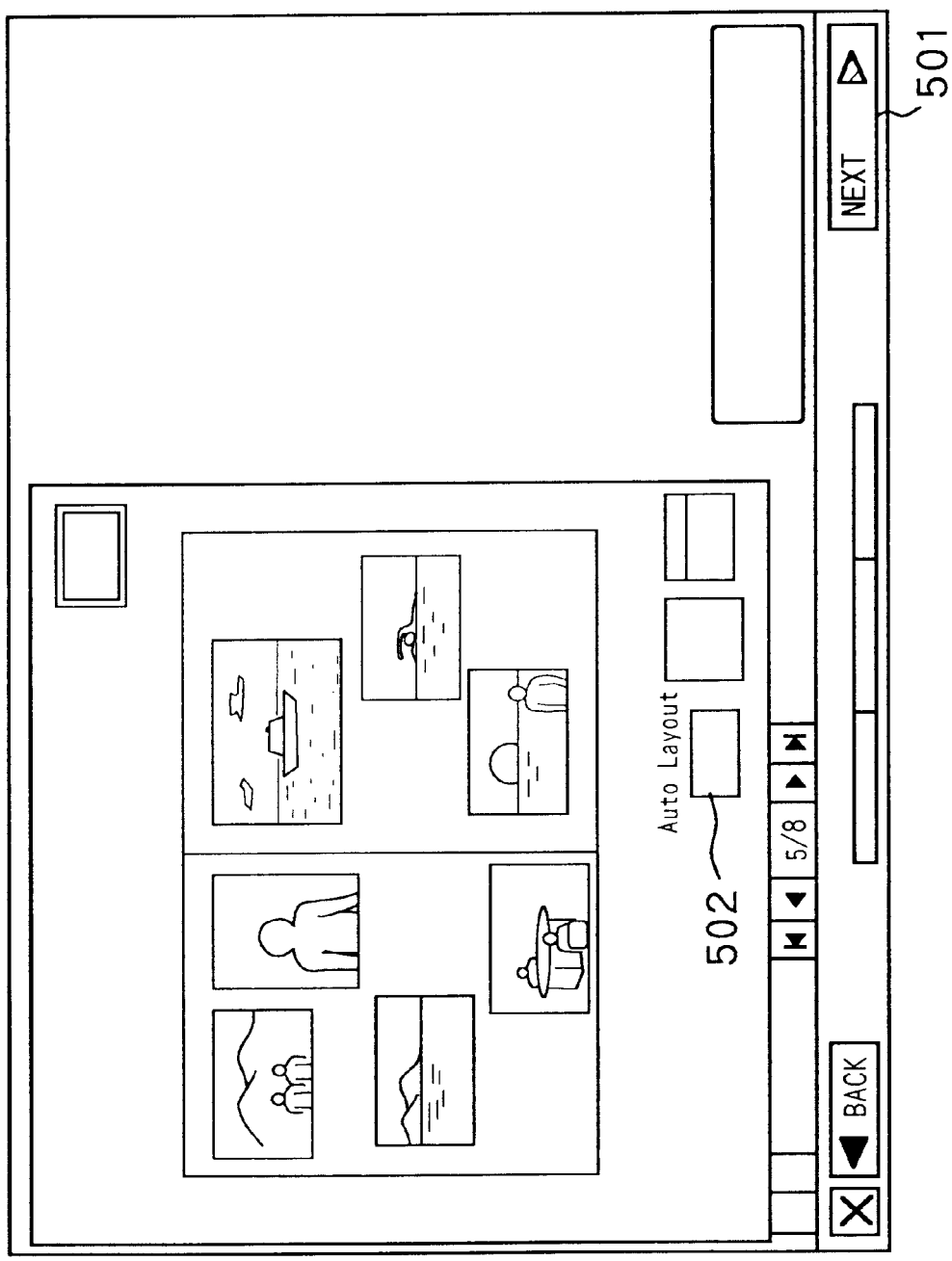
FIG. 5 is a view showing an example of a window displaying a layout result in the embodiment.

In step S207, the layout result is displayed on the display unit 112. FIG. 5 shows an example of the automatic layout result. A page turning button (NEXT button) 501 for sequentially displaying pages is displayed on the lower portion of the window to allow the operator to display and check an arbitrary page.

With the above processing, the images are completely laid out in this embodiment.

The above automatic layout processing in step S206 will be described in detail below with reference to the flow chart of FIG. 6.

Figure 7A:
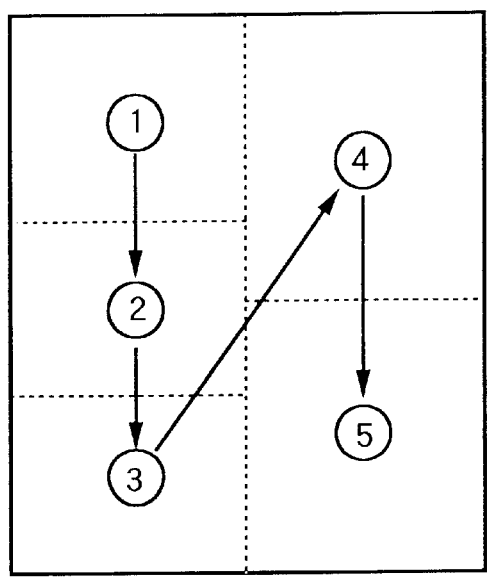
FIGS. 7A to 7C are views for explaining rough arrangements used for initial layout processing in the automatic layout processing in the embodiment.
Figure 7B:
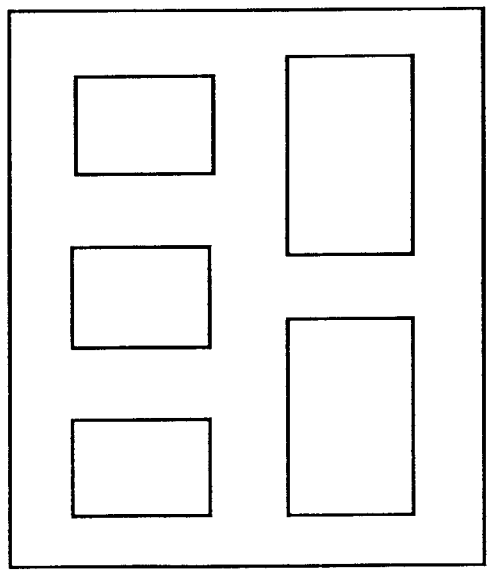
Figure 7C:
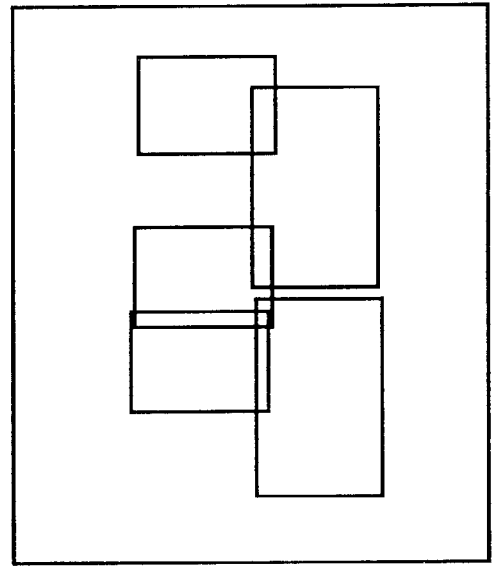

In automatic layout processing, first of all, initial layout processing is performed by the initial layout unit 113 in step S501. A rough sequence of arrangement on a page is prepared, and rough layout processing is performed in accordance with the sequence. Assume that in this embodiment, the mode of laying out five images per page is selected. FIG. 7A shows the sequence of arrangement to be set when five images are laid out per page. In the initial layout processing, the images are uniformly laid out in the sequence shown in FIG. 7A. The images include images having different aspect ratios, and images with portrait and landscape orientations. In this initial layout stage, therefore, some images do not overlap, as shown in FIG. 7B, but some images greatly overlap each other, as shown in FIG. 7C.

The images input from films include images having three different aspect ratios, namely "classic", "high-vision", and "panorama". In this embodiment, optimal image sizes are determined in advance with respect to the respective aspect ratios and the numbers of images to be laid out per page.

Table 1 shows the relationship between the aspect ratios of images, the numbers of images to be laid out per page, and the image sizes on the respective pages.

TABLE 1

| | Image Size (cm) | | |
|---|---|---|---|
| | 3 | 4 | 5 |
| Classic | 8.3 × 11.7 | 7.1 × 9.7 | 6.4 × 9.0 |
| High-vision | 7.6 × 12.9 | 6.5 × 11.0 | 5.8 × 9.9 |
| Panorama | | 6.0 × 18.0 | |

To cope with the above situation, a counter N is initialized to 0 in step S502. This counter N serves to count the number of times an image overlap amount is adjusted.

In step S503, the layout is finely adjusted by the layout adjustment unit 115. More specifically, the layout adjustment unit 115 performs fine adjustment by moving the respective images to reduce the overlap areas of the respective images which are evaluated by the layout evaluation unit 114. This fine adjustment is performed as follows. In the initial layout processing, first of all, images 2 to 5 are fixed, and the first image is slightly moved in the X and Y directions, as shown in FIG. 7A. For example, this moving amount corresponding to 1 mm on a printout. When the overlap amount between the first image and the adjacent image after the movement becomes a proper value in terms of the sizes, positions, number, and the like of images, fine adjustment for the first image is complete. If the overlap amount is not proper, the first image is repeatedly moved little by little until the overlap amount becomes the proper value. If the overlap amount deviates from the proper value after the movement, the direction in which the image is slightly moved is changed.

When fine adjustment for the first image is complete in this manner, images 1, 3, 4, and 5 are fixed, and fine adjustment for the second image is performed in the same manner as described above. Subsequently, fine adjustment is also executed for images 3, 4, and 5 in the same manner. It is then checked in step S504 whether the value of the counter N has reached a prescribed count T. In this embodiment, the prescribed count T is determined in advance. For example, the count T is set to 500. If the value of the counter N is smaller than the count T, the flow advances to step S505 to perform overlap amount evaluation. If the value of the counter N becomes equal to the count T, the processing for this page is terminated. The layout of the page is then confirmed, and the flow advances to step S507.

If it is determined in step S504 that the value of the counter N is smaller than the count T, the flow advances to step S505 to evaluate the overlap areas between the respective images on the page. The respective overlap areas are obtained first, and it is then checked whether each overlap area is larger than a predetermined value, thereby evaluating the overlap areas. If it is determined each overlap area is larger than the predetermined value, the flow advances to step S506 to increment the counter N. After the counter N is incremented by one, the flow advances to step S503.

If it is determined in step S505 that each overlap area is smaller than the predetermined value, the fine adjustment processing for the layout of this page is terminated, and the layout of the page is confirmed. The flow then advances to step S507. When the layout is confirmed, parameters such as the coordinate values and sizes of the respective images are temporarily stored in the memory unit 109 to be read out for a display or print operation afterward.

In step S507, it is checked whether automatic layout processing for all the pages is complete. If there is a page which has not undergone automatic layout processing, the flow advances to step S501 to perform automatic layout processing for the next unprocessed page.

When layout processing is continuously performed for all the pages in the same manner as described above, and it is determined in step S507 that processing for all the pages is complete, the automatic layout processing is terminated.

After this processing, when, for example, each page having undergone this layout processing is printed out by the print unit 108, automatically laid out image outputs can be obtained by a simple operation.

As described above, according to this embodiment, a desired template is selected, and the images to be inserted in this template are simply selected from read images. Automatic layout processing for all pages is then terminated by simply designating the positions of the respective images. In addition, since this automatic layout result can be checked on the display screen of the display unit 112, layout processing can be easily performed without any special skill.

Second Embodiment

The second embodiment of the present invention will be described next with reference to FIG. 2.

In the first embodiment described above, the images to be laid out are selected in step S203. In some case, however, all input images may be laid out in the input order. In this case, the image selection unit 102 in FIG. 1 and steps S203 and S204 in FIG. 2 are not required. In the flow chart of FIG. 2, therefore, steps S203 and S204 are omitted.

In this case, in the automatic layout processing in step S206, the input images are automatically laid out, in the input order, for the number of images designated in step S202 at a time, in units of pages.

With this control, all images can be automatically laid more easily than in the first embodiment, and display outputs for all the images can be obtained. When, for example, these outputs are printed out by a print unit 108, photographs can be output in the form of an album.

Third Embodiment

The third embodiment of the present invention will be described next with reference to FIG. 2.

In the first embodiment described above, the number of images to be laid out per page is designated in step S202. The operator may, however, wish to change the number of images to be laid out in units of pages. In such a case, the image count selection unit 101 in FIG. 1, and step S202 in FIG. 2 are not required. In the flow chart of FIG. 2, therefore, step S202 is omitted.

In this case, in image selection in step S203, an arbitrary number of images can be allocated to one page in the image selection window in FIG. 4. In step S206 in FIG. 2, the image size is automatically increased or decreased in accordance with the number of images to be arranged on one page.

With this control, layout processing corresponding to the operator's intention can be performed more easily than in the first embodiment, and display outputs for all the images can be obtained. When, for example, these outputs are printed out by a print unit 108, photographs can be output in the form of an album.

Fourth Embodiment

The fourth embodiment of the present invention will be described next with reference to FIG. 2.

In the first embodiment, an image is rotated to adjust the position of the image in step S205. If, however, all images are input in proper positions, no image needs to be rotated. In this case, the image rotation designation unit 103 and the image rotation unit 104 in FIG. 1 and step S205 in the flow chart of FIG. 2 are omitted.

As a result, desired images can be laid out more easily than in the first embodiment. When, for example, these images are printed out by a print unit 108, photographs can be output in the form of an album.

Fifth Embodiment

In the above embodiments, input data from a film are used as input images. However, the present invention is not limited to this. As the input device, any type of image input device, e.g., a digital camera, a digital VTR, a flatbed scanner, an MO, a ZIP, a PD, a floppy disk, a laser disk, a DVD, or a network, can be connected to the apparatus. As the print unit 108 in FIG. 1, any type of image output device, e.g., a BJ printer, an LBP printer, a color laser copier, a film recorder, or a video printer, can be connected to the apparatus. In addition, in the above embodiments described above, the keyboard and the mouse are used as the operation command input unit 111 in FIG. 1. However, a pointing device such as a trackball or touch panel can be used in place of the mouse.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As described above, according to this embodiment, images can be neatly laid out automatically and easily as if a professional designer laid out the images.

By evaluating the overlap amounts between the respective images of a layout result obtained by initial layout processing, a beautiful layout result can be easily obtained.

Sixth Embodiment

Figure 2:
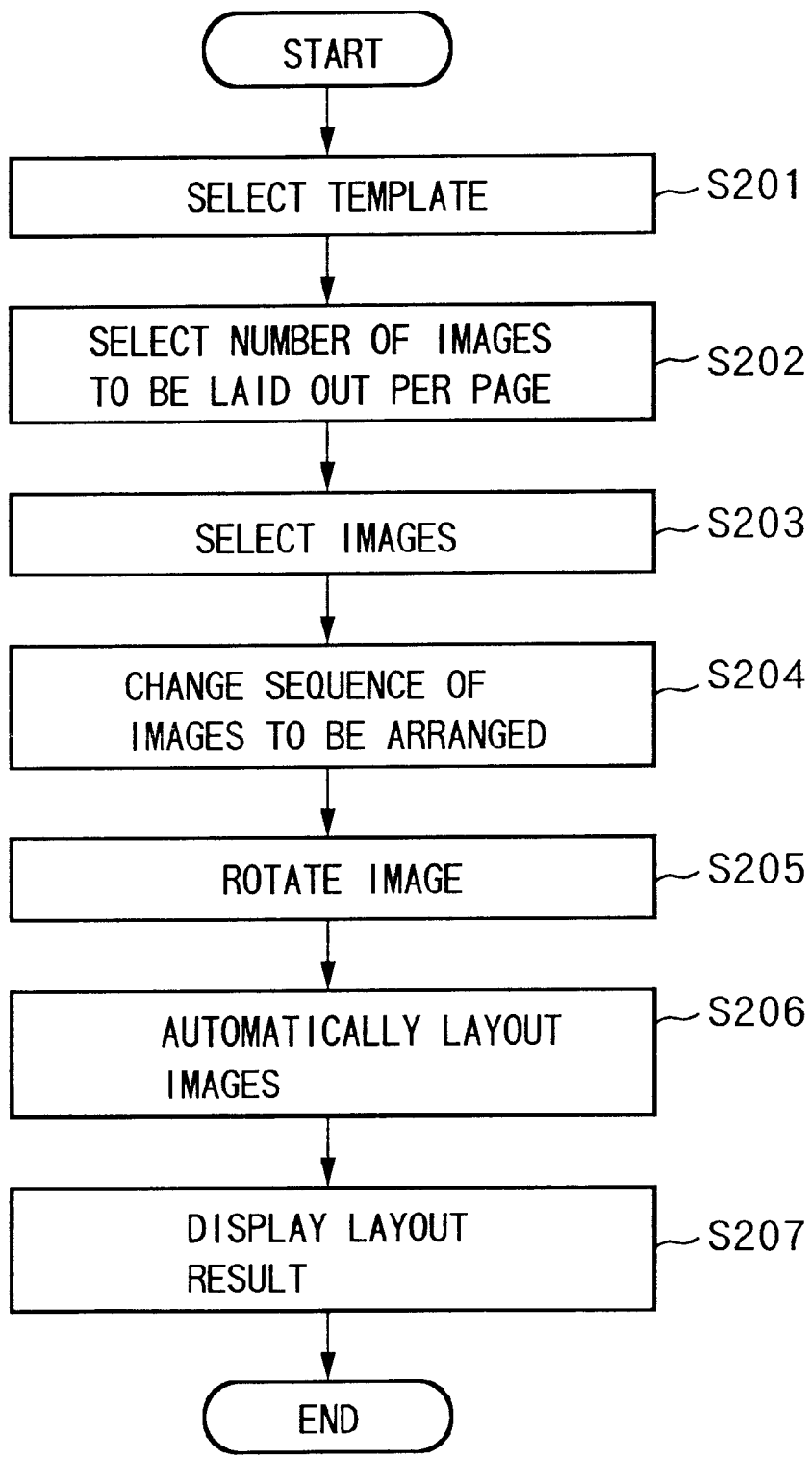
FIG. 2 is a flow chart showing the functional flow in the image layout apparatus according to the embodiment.
Figure 6:
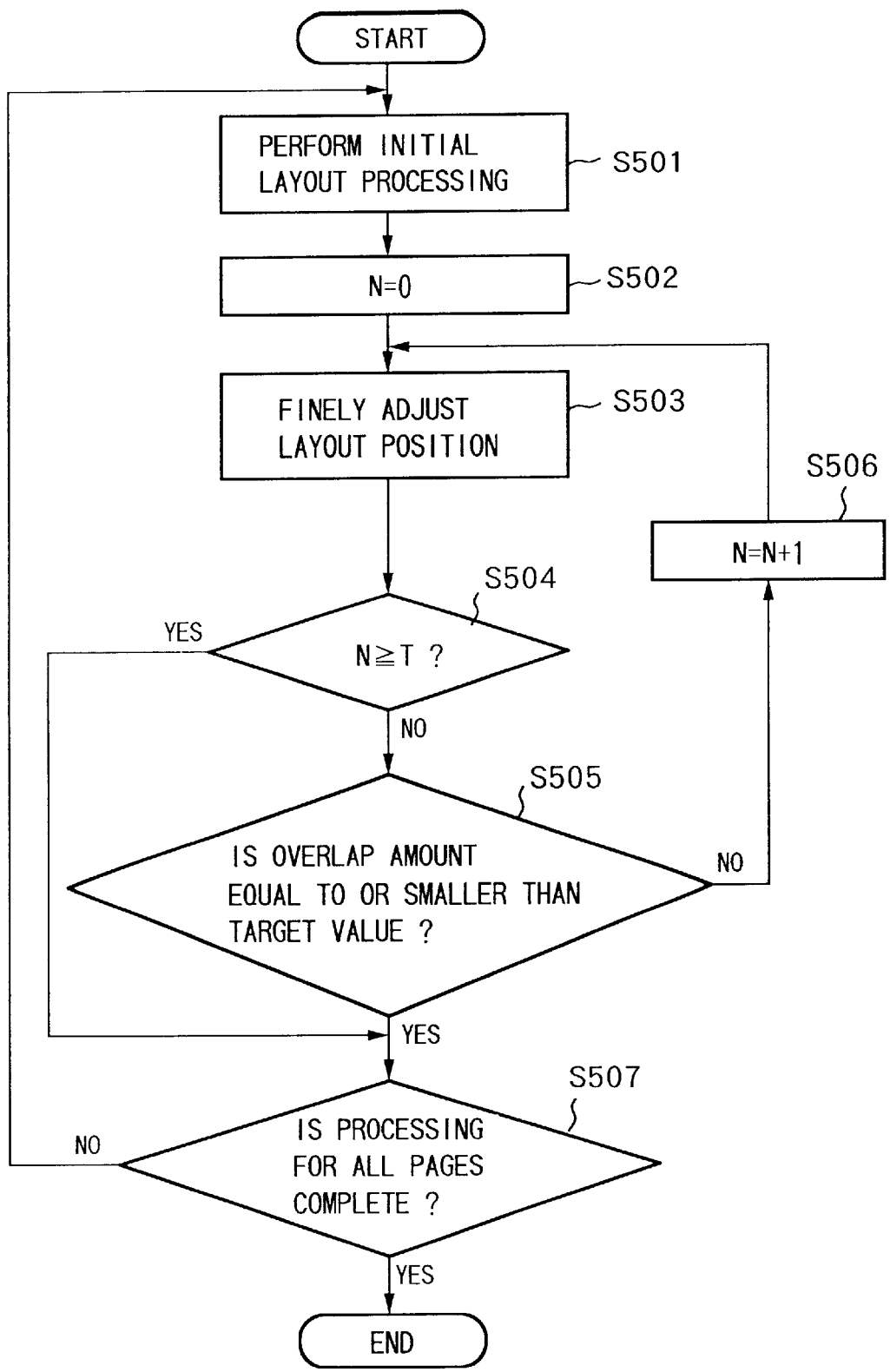
FIG. 6 is a flow chart showing automatic layout processing in FIG. 2 in detail.

In the above embodiment, the automatic layout processing in step S206 in FIG. 2 is performed in the manner shown in FIG. 6. This processing is preferably performed in the manner shown in FIG. 8. In the above embodiment, as a layout evaluation parameter, the overlap amount between images is used. In this embodiment, various other parameters associated with layout positions are also used for overall evaluation of a layout, thereby further optimizing the layout.

Figure 8:
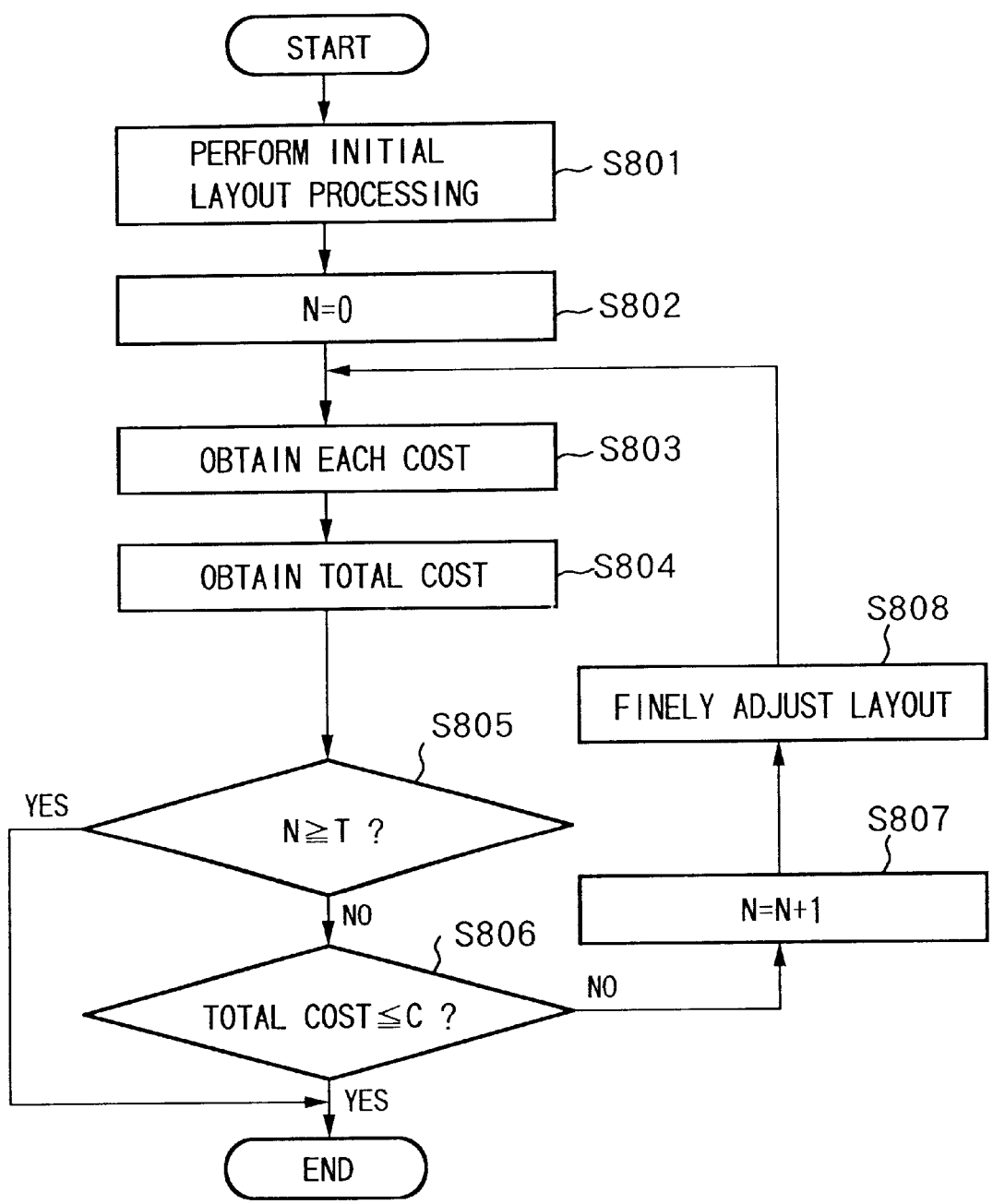
FIG. 8 is a flow chart showing automatic layout processing in the sixth embodiment of the present invention in detail.
Figure 9:
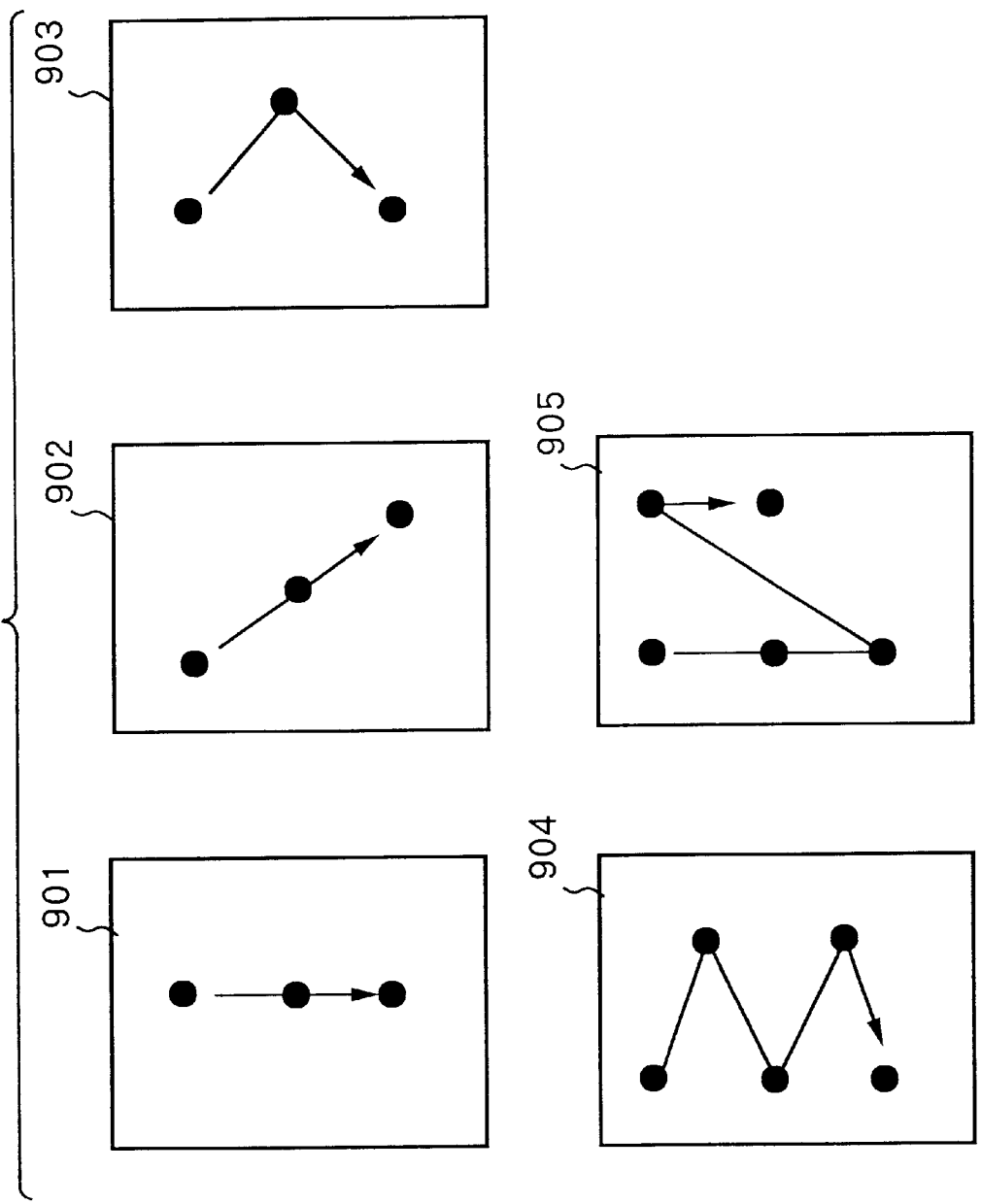
FIG. 9 is a view showing initial layout patterns.

Referring to FIG. 8, in step S801, initial layout processing is performed by an initial layout unit 113. In the field of design, layout patterns for optimizing layouts are used to lay out images. There are a plurality of layout patterns based on the empirical rules in design. FIG. 9 shows the layout patterns used in this embodiment. Reference numerals 901 to 903 denote patterns each used to lay out three images on one page; and 904 and 905, patterns each used to lay out four to five images on one page. When the number of images is set to three as the initial setting, the pattern 901 is automatically selected. When the number of images is set to four or five as the initial setting, the pattern 904 is automatically selected.

The operator can sequentially select the above layout patterns by clicking on an automatic layout button 502 in FIG. 5. The selected layout pattern is used as an initial layout. When the number of images is set to three, a layout pattern is set in the order of the layout patterns 901, 902, 903, 901, . . . every time the button is clicked. When the number of images is set to four or five, a layout pattern is set in the order of the layout patterns 904, 905, 904, . . . .

Assume that in this embodiment, the mode of laying out five images per page is selected. In the initial layout processing, the centers of images are uniformly laid out according to the pattern 904. The images include images having different aspect ratios, and images with portrait and landscape orientations. In this initial layout stage, therefore, some images do not overlap, but some images greatly overlap each other.

In step S802, a counter N is initialized to 0. This counter N is used to count the number of times image position adjustment is performed.

In step S803, the cost of each layout result is obtained by a layout evaluation unit 114. Costs indicate the evaluation values of layout results which are evaluated in various respects. For example, evaluation items include the following:

(1) image overlap amount (2) image gap amount (3) image gap amount deviation (4) image position offset amount The evaluation of an image overlap amount means the evaluation of the overlap area between images. As the total overlap area between the images on an entire layout window, a better layout can be obtained. The overlap area between the respective images is obtained, and the value obtained by dividing the overlap area by the total area of the original images is used as a cost.

The evaluation of an image gap amount means the evaluation of the alignment of the edge portions of images. As edges are aligned, a better layout can be obtained. The gaps between the edges of images are obtained in the horizontal and vertical directions, respectively, and each obtained value is divided by a predetermined value to obtain a cost.

The evaluation of an image gap amount deviation means the evaluation of the deviation of the gap between the edges of images when they do not overlap each other. As the gaps on an entire layout window become uniform in the horizontal or vertical direction, a better layout can be obtained. The gaps between the edges of images are obtained in the horizontal and vertical directions, respectively, and each deviation from the average value is obtained as a cost.

The evaluation of an image position offset amount means the evaluation of the balance between the moments of images from the horizontal and vertical axes of a page calculated with the images being regarded as objects having masses.

Figure 10:
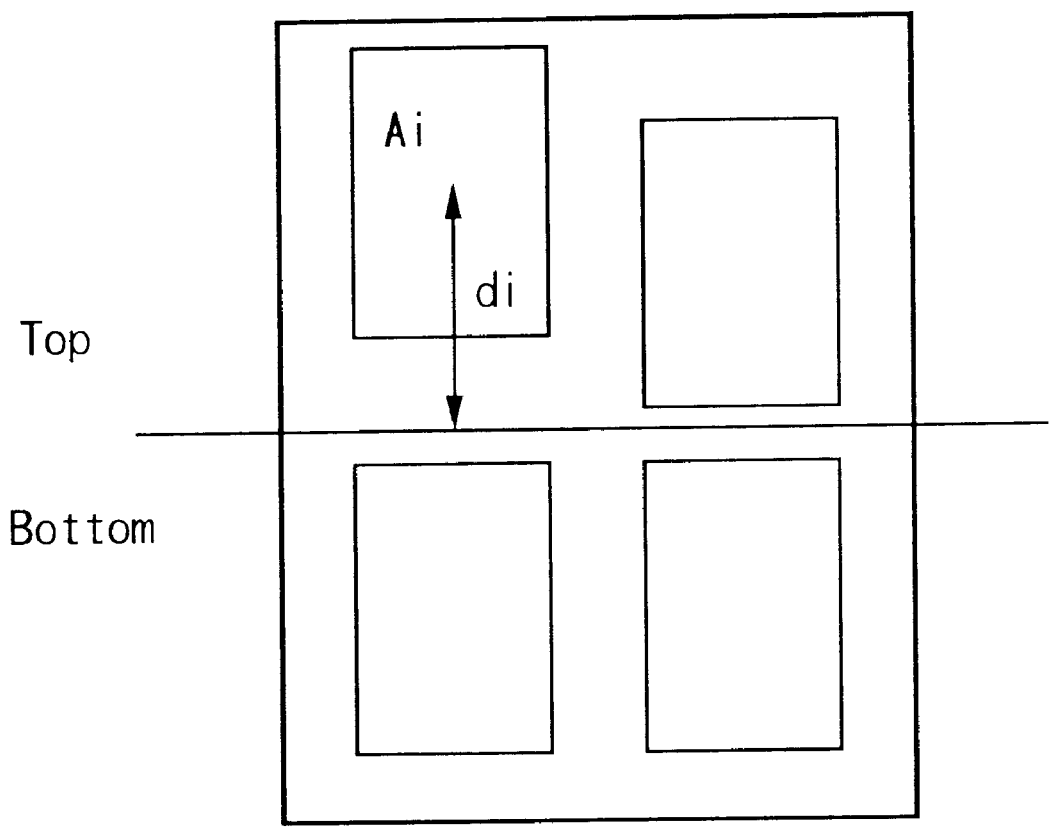
FIG. 10 is a view for explaining the moments of images.

This evaluation will be described with reference to FIG. 10.

Assume that n images are present on the upper and lower sides of the horizontal central axis. Letting Ai be the area of an image i, and di be the distance from the horizontal central axis to the center of the image, a total moment Mt on the upper side of the horizontal central axis is given by $$Mt = \sum_{i=0}^{i=n-1} Ai di \quad (a)$$

A total moment Mb on the lower side of the horizontal central axis is given by $$Mb = \sum_{i=0}^{i=n-1} Ai di \quad (b)$$

A cost Ch with respect to the horizontal central axis is given by $$Ch=|Mt-Mb| \quad (c)$$

Since a cost Cv with respect to the vertical central axis is obtained in the same manner as described above, a description thereof will be omitted.

Assume that n images are to be laid out, and the coordinates of the centers of the n images are represented by (x0,y0), . . . , (xn−1,yn−1). In this case, the evaluation functions of the image overlap amounts, the image gap amounts, the image gap amount deviations, and the image position offset amounts can be expressed as $$f1=a*F\_overlap(x0,y0,x1,y1, \ldots, xn-1,yn-1) \quad (1)$$

$$f2=b*F\_edge(x0,y0,x1,y1, \ldots, xn-1,yn-1) \quad (2)$$

$$f3=c*F\_distribute(x0,y0,x1,y1, \ldots, xn-1,yn-1) \quad (3)$$

$$f4=d*F\_moment(x0,y0,x1,y1, \ldots, xn-1,yn-1) \quad (4)$$

where a, b, c, and d are the weighting coefficients for the respective evaluation functions. As these coefficients, the values determined in advance by experiment are used.

The sum total of a, b, c, and d are normalized to $$a+b+c+d+e=1.0 \quad (5)$$

The values of the respective functions are also normalized to $$0<=F\_overlap(\ ),F\_edge(\ ),F\_distribute(\ ),F\_momento<=1.0 \quad (6)$$

In this case, a smaller value of each of the evaluation costs f1, f2, . . . indicates a better layout result.

In step S804, an overall evaluation value,. i.e., a total cost, is obtained. In this embodiment, a total cost Cost is given by $$Cost=f1+f2+f3+f4 \quad (7)$$

If, for example, m evaluation functions are set, the total cost is given by $$Cost = \sum_{i=1}^{m} fi \quad (8)$$

In this case, as each of evaluation costs f1, f2, . . . decreases, a better layout result can be obtained. That is, a smaller value of the total cost Cost indicates a better layout.

In step S805, it is checked whether the value of the counter N has reached a prescribed count T. The prescribed count T is determined in advance. In this embodiment, the count T is set to 500. If the value of the counter N is smaller than the count T, the flow advances to step S806 to evaluate the cost. When the value of the counter N becomes equal to the count T, the processing is terminated, and the corresponding state is determined as the optimal layout.

It is checked in step S806 whether the cost Cost obtained in step S804 is equal to or smaller than an evaluation reference value C as a target value, thereby performing cost evaluation. If the cost Cost is equal to or smaller than the value C, since it indicates the optimal layout, the processing is terminated. If the cost Cost is larger than the value C, the flow advances to step S807.

In step S807, the counter N is incremented. After the counter N is incremented by one, the flow advances to step S808.

In step S808, the position of the layout is adjusted by the layout adjustment unit 115. That is, each image is moved by a small amount. The moving direction of each image is determined by the change amount of the cost Cost obtained in step S803. More specifically, when the cost becomes smaller than the previous cost, each image is kept moved in the same direction to perform position adjustment. In contrast to this, when the cost becomes larger than the previous cost, each image is moved in a direction reverse or perpendicular to that in the previous operation. When position adjustment is complete, the flow returns to step S803.

When the same processing as described above is performed for all the pages, and automatic layout processing is complete, the flow shifts to step S207.

Note that the upper value N of the number of times of adjustment and the target value C of the total cost can be set by the user with an operation command input unit 111.

The layout adjustment unit 115 need not always perform adjustment after evaluation is performed by the layout evaluation unit 114. For example, evaluation values may be displayed on the display unit 112 to allow the user to manually adjust an image layout in accordance with his/her preference.

As described above, according to this embodiment, the initial layout is adjusted by performing overall evaluation using an image gap amount, a gap amount deviation, a moment, and the like as evaluation parameters for an image layout in addition to the overlap amount between images. With this processing, a more beautiful layout result can be obtained.

Seventh Embodiment

Methods of obtaining a layout with a more attractive appearance in accordance with the preference of a user in the automatic layout processing in the first to sixth embodiments will be described below. For example, a method of optimizing the overlap amounts of images when they are allowed to overlap is known. It is also known that when a layout includes a background image, a better layout result can be obtained with an image size smaller than that when a layout includes no background image. In this embodiment, images are attractively laid out without complicating the operation performed by the operator and producing any monotonous layout result.

Figure 11:
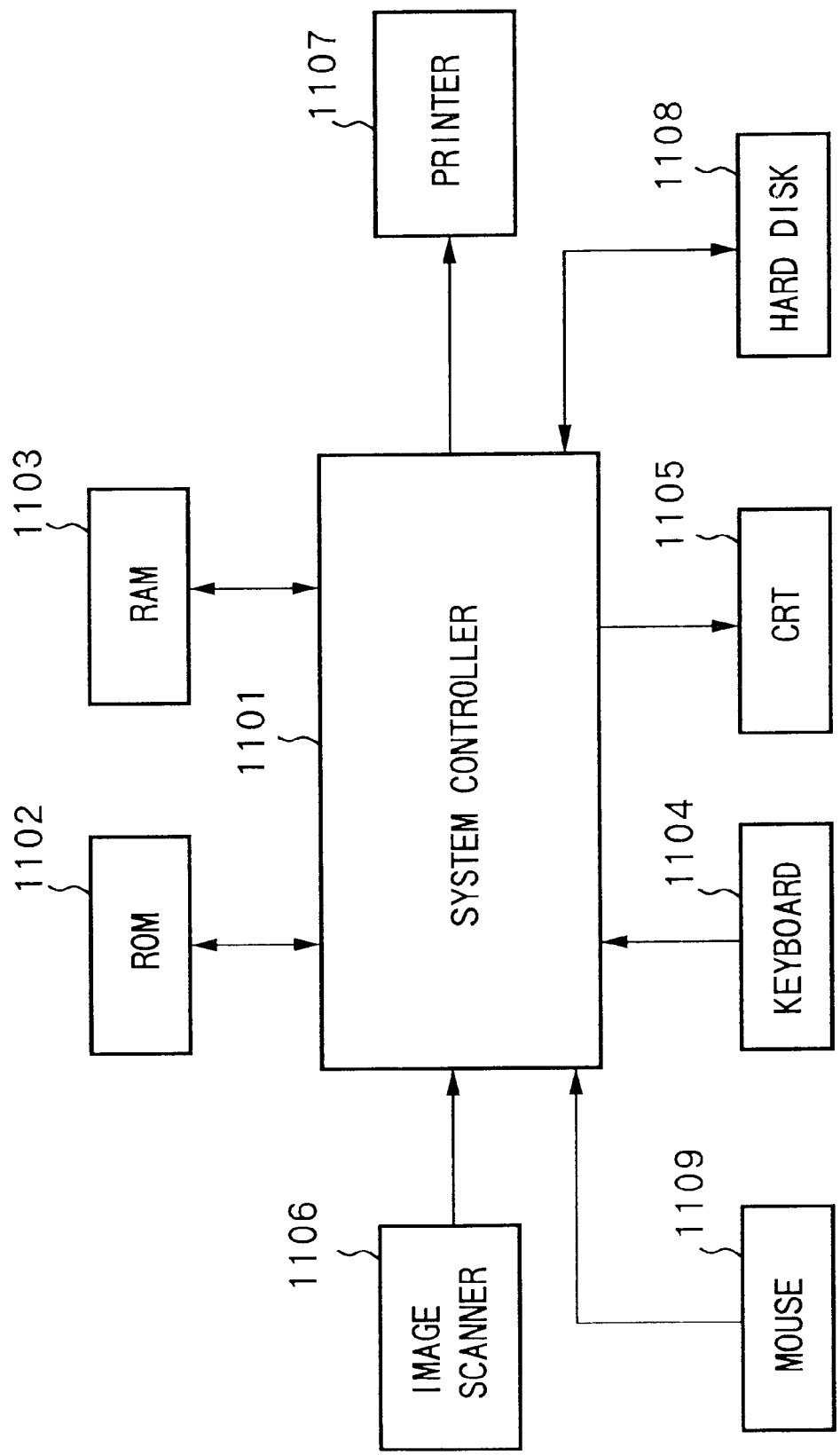
FIG. 11 is a block diagram showing the system configuration of the embodiment.

FIG. 11 shows the overall arrangement of this embodiment.

Referring to FIG. 11, reference numeral 1106 denotes an image scanner for inputting original images; 1108, a hard disk serving as an external storage unit to temporarily store the original images input by the image scanner 1106; 1101, a system controller for performing sequence control and arithmetic processing to lay out/edit the original images on a virtual sheet; 1103, a RAM used as the work area or the like of the system controller 1101; 1102, a ROM storing control programs for the system controller 1101, predetermined templates, various parameters, and the like; 1104, a keyboard; and 1109, a mouse. The keyboard and mouse are used as means used by the operator to input commands for image layout processing and the like. Reference numeral 1105 denotes a CRT for displaying images, templates, a sheet image as an editing result, and the like; and 1107, a printer for outputting the finished sheet image.

The above arrangement can be implemented by a general personal computer and the like as well as dedicated hardware.

Figure 12:
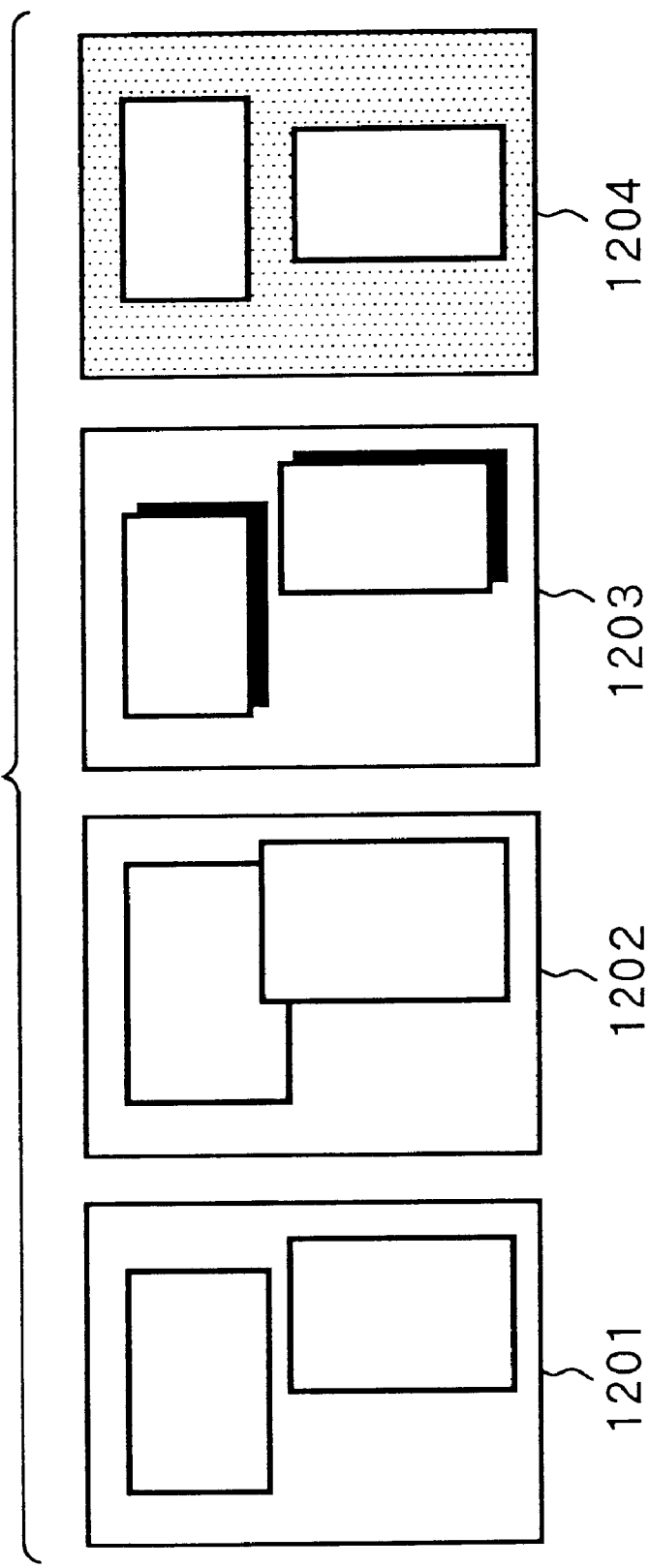
FIG. 12 is a schematic view showing layout patterns.

FIG. 12 shows sample layout patterns each obtained by laying out two images with portrait and landscape orientations within one sheet upon designation of an effect. Referring to FIG. 12, reference numeral 1201 denotes a layout pattern without designation of any effect; 1202, a layout pattern obtained upon designation of an image overlapping effect; 1203, a layout pattern obtained upon designation of a drop shadow effect; and 1204, a layout pattern obtained upon designation of a background image effect. These layout patterns 1201 to 1204 will be referred to as layout patterns 1 to 4 hereinafter.

Figure 13:
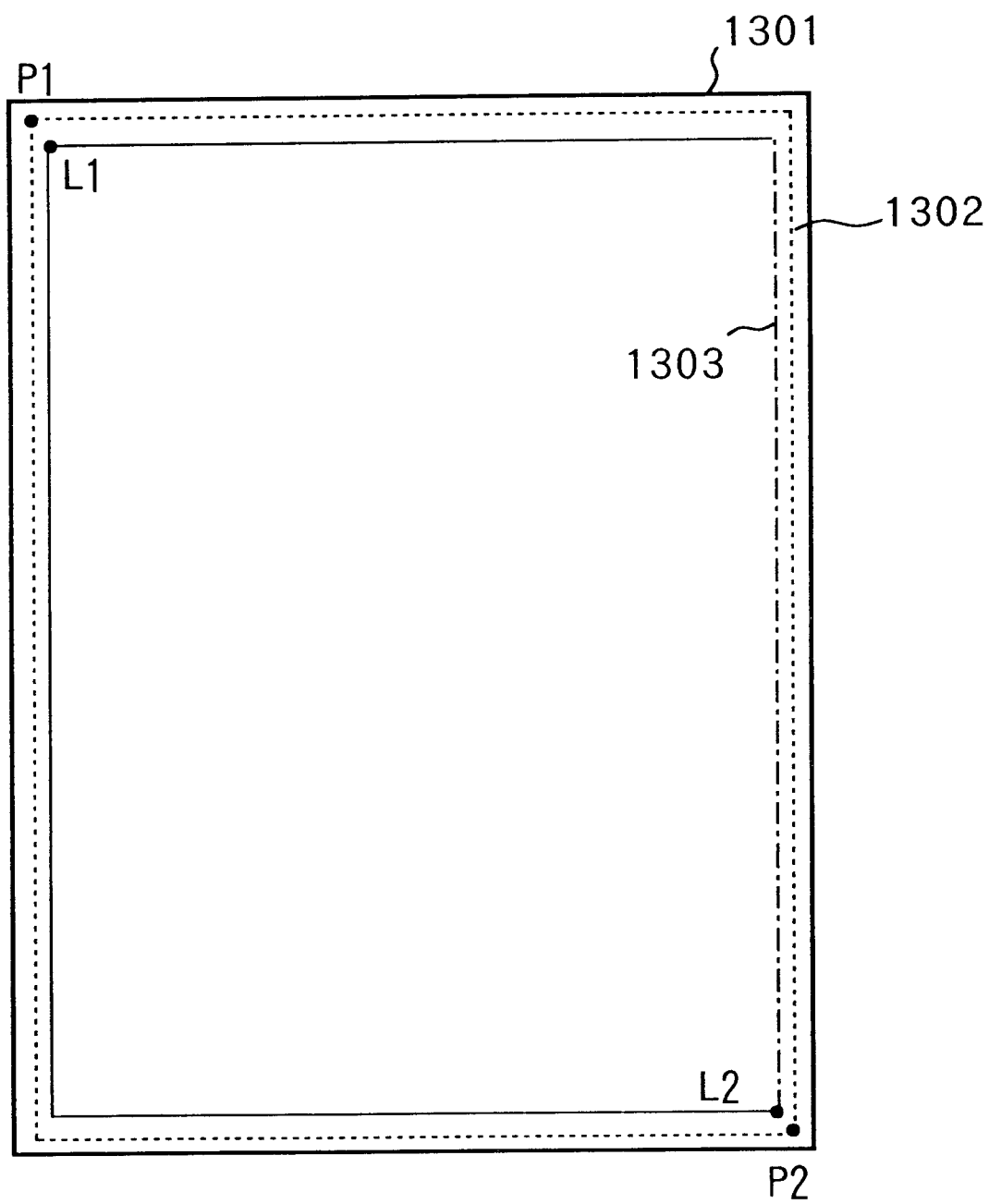
FIG. 13 is a view showing a print sheet in detail.

FIG. 13 is a view for explaining the printable area and image layout area of a print sheet. Referring to FIG. 13, reference numeral 1301 denotes the outer appearance of the sheet; 1302, the printable area in which the printer can print; and 1303, an image layout area. Reference symbols P1 and P2 denote the coordinates of diagonal points of the printable area 1302; and L1 and L2, the coordinates of diagonal points of the layout area 1303.

Figure 14:
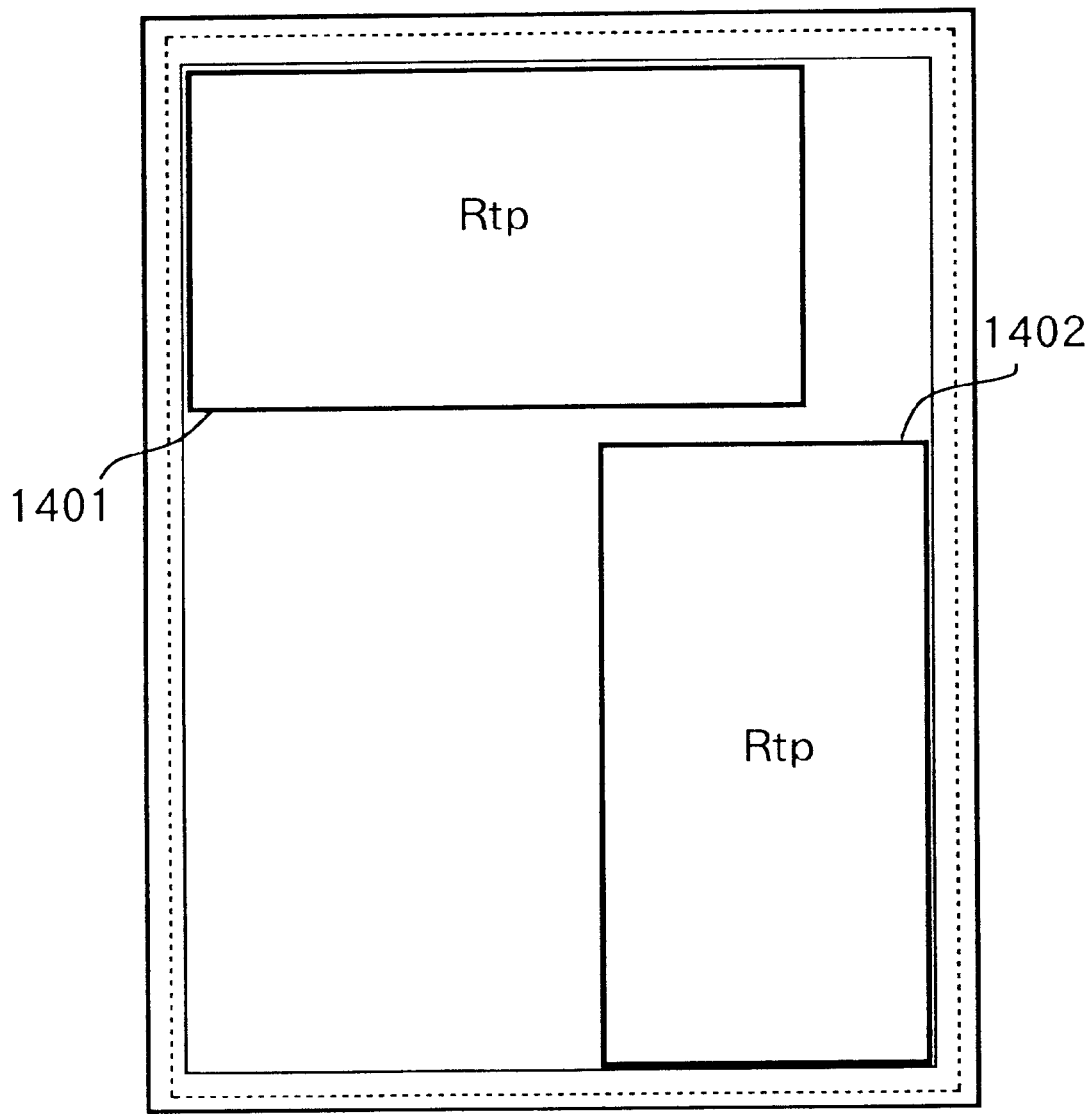
FIG. 14 is a view showing layout pattern 1.

FIG. 14 shows a layout without designation of any effect, i.e., layout pattern 1. Referring to FIG. 14, reference numerals 1401 and 1402 denote images each having a standard layout size Rtp. Assume that layout conditions such as this layout size and layout positions are set to predetermined values in advance to lay out images on a sheet to have a good balance, and are stored in the ROM 1102.

Figure 15:
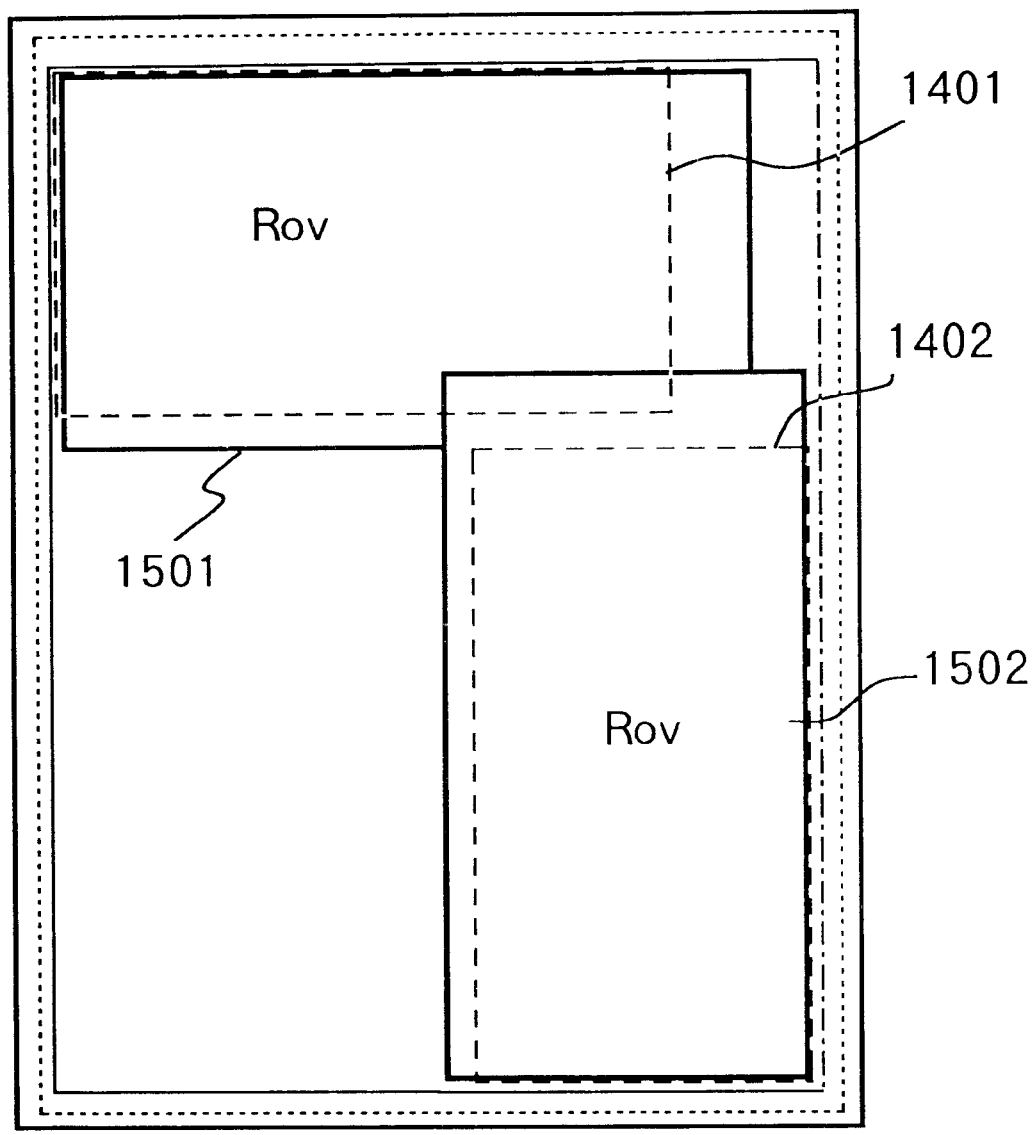
FIG. 15 is a view showing layout pattern 2.

FIG. 15 shows a layout pattern obtained upon designation of an image overlapping effect, i.e., layout pattern 2. Referring to FIG. 15, reference numerals 1501 and 1502 denote images each having a layout size Rov; and 1401 and 1402, the images each having the standard layout size Rtp in FIG. 14. As shown in FIG. 15, the layout size Rov is larger than the standard layout size Rtp, and the images 1501 and 1502 are arranged to overlap each other. In this case, the ratio of the layout size Rov to the standard layout size Rtp, i.e., Rov/Rtp, is set to optimize the overlap amount, and is stored in the ROM 1102 in advance. In this embodiment, for example, this ratio is set to 1.2.

Figure 16:
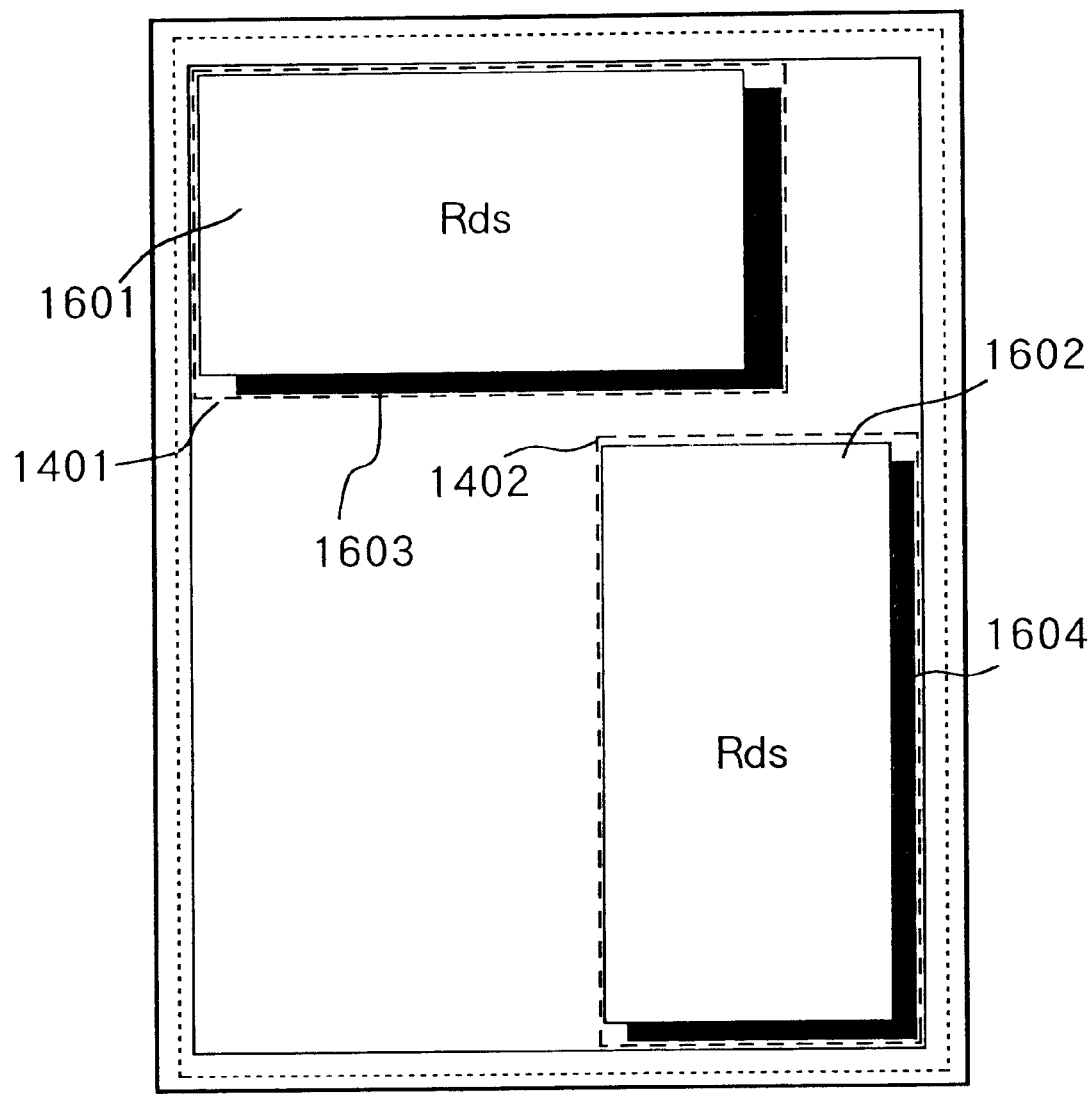
FIG. 16 is a view showing layout pattern 3.

FIG. 16 shows a layout pattern obtained upon designation of a drop shadow effect, i.e., layout pattern 3. Referring to FIG. 16, reference numerals 1601 and 1602 denote images each having a layout size Rds; and 1603 and 1604, drop shadows. As shown in FIG. 16, the layout size Rds is the next smaller size than the standard layout size Rtp, and shadow images are pasted on the marginal areas, i.e., the areas corresponding to the difference between the size Rtp and the size Rds, to look as if the shadows projected on the background upon illumination from a light source in a predetermined direction. With this effect, the images look as if floated from the background by a predetermined height. In this case, the ratio of the size Rds to the standard size Rtp, i.e., Rds/Rtp, is stored in the ROM 1102 in advance. In this embodiment, for example, this ratio is set to 0.95.

In layout patterns 1 to 4 described above, layout positions are set such that the images are laid out to be aligned with the frame of the layout area 1303.

Figure 17:
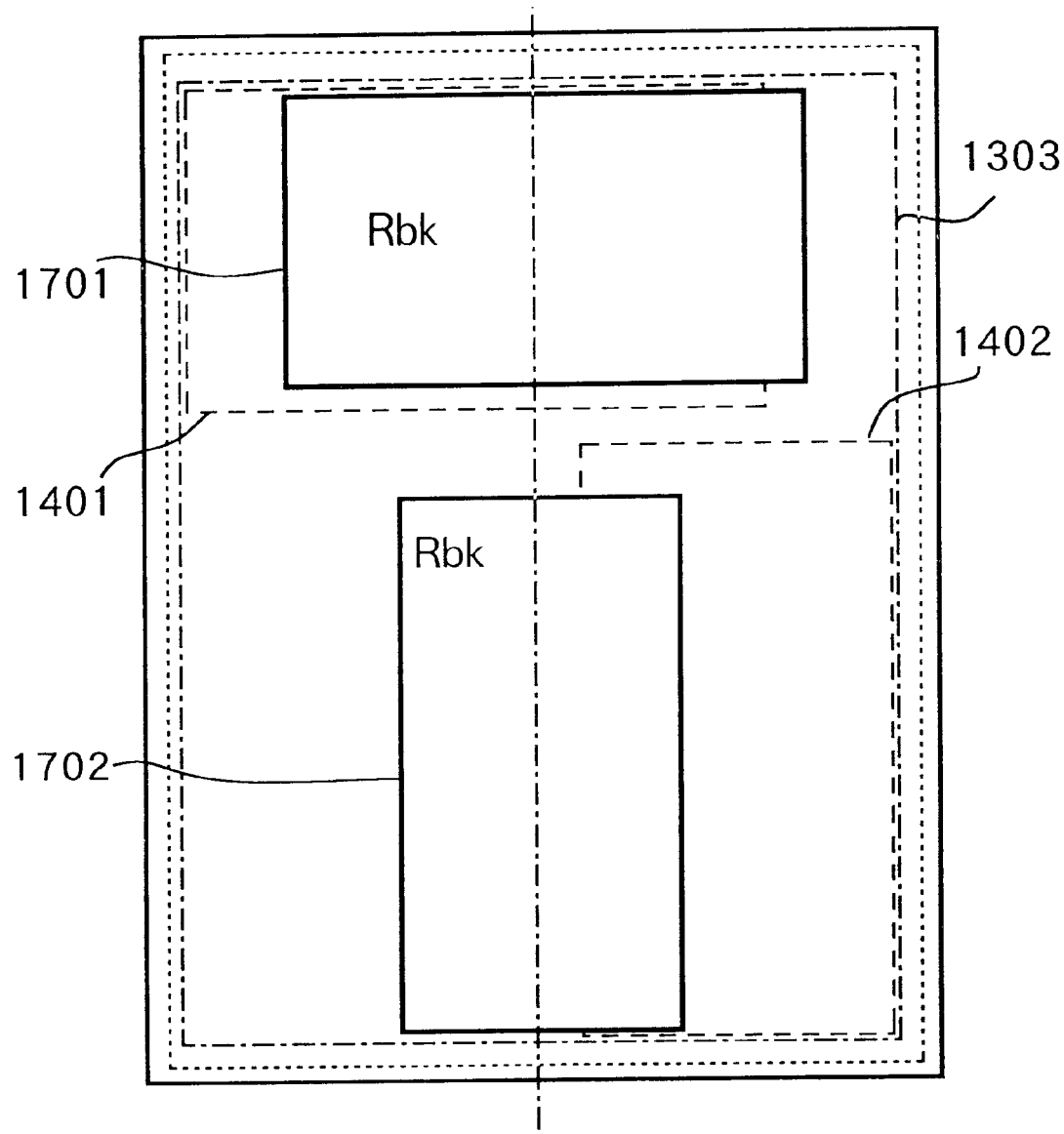
FIG. 17 is a view showing layout pattern 4.

FIG. 17 shows a layout pattern obtained upon designation of a background image effect, i.e., layout pattern 4. Referring to FIG. 17, reference numerals 1701 and 1702 denote images each having a layout size Rbk; and 1703, a background image. In this case, the background image 1703 is set in advance and stored in the ROM 1102. The ratio of the size Rbk to the standard layout size Rtp, i.e., Rbk/Rtp, is also stored in the ROM 1102. In this embodiment, for example, this ratio is set to 0.80.

When a background image is present as in this case, layout positions are set such that the middle point of the layout area 1303 in the horizontal direction coincides with the middle point of the width of each of the images 1701 and 1702. This prevents the background image from being offset within the sheet, and hence a good balance can be ensured.

The operation of the system controller 1101 in this embodiment, based on the control programs stored in the ROM 1102, will be described next with reference to the flow chart of FIG. 18.

When this system is started, original images are read by the image scanner 1106 in step S1801. The read original images are stored in the RAM 1103 or the hard disk 1108 or the like connected to the system controller 1101.

In step S1802, the input original images are displayed on the CRT 1105.

In step S1803, the operator checks the original images displayed on the CRT 1105, and designates the orientation of each image, i.e., a portrait or landscape orientation. The operator may use any designation method, e.g., a method of designating the orientation of each image by using a dedicated portrait/landscape designation key assigned to the image rotation unit 104 or a method of graphically designating an orientation with a pointing device such as the mouse 1109. In this case, the operator also designates one of the above effects.

In steps 1804 to 1806, the effect designated by the operator is checked. In steps 1807 to 1810, layout conditions for the execution of each effect, i.e., a layout size and layout positions, are set. If the image overlapping effect is determined in step S1804, the layout size is set to Rov=Rtp×1.2 in step S1807. If the drop shadow effect is determined in step S1805, the layout size is set to Rsh=Rtp×0.95 in step S1808. If the background image effect is determined in step S1806, the layout size is set to Rsh=Rtp×0.80 in step S1809. In step S1810, "centering" is designated as the layout positions. That is, the middle point of the width of each image is caused to coincide with the middle point of the layout area 1303 in the horizontal direction.

If NO in steps 1804 to 1806, the layout size is set to the standard value, i.e., Rtp, in step S1811.

The parameters such as the layout positions and the size set in this manner are temporarily stored in the RAM 1103 to be read out for a display and print operation afterward.

In step S1812, a layout pattern is displayed on the CRT 1105 on the basis of the layout conditions set in the above steps.

In step S1813, the images are laid out in accordance with the layout pattern set in the above manner. In step S1814, the layout result is displayed on the CRT 1105. In this case, the layout is displayed in accordance with the image portrait/landscape information input in step S1803.

In step S1815, the operator checks the layout displayed on the CRT 1105 and designates whether to confirm it. If NO in step S1815, the flow returns to step S1804 to input a command again to perform layout processing again.

If the layout is confirmed in step S1815, the layout parameters are transmitted from the RAM 1103 to the printer 1107. As a result, the layout image is printed on a print sheet, and the processing is terminated.

This apparatus may be designed such that if the layout is not confirmed in step S1815, the operator can adjust the layout by finely moving each image with the keyboard 1104, the mouse 1109, and the like.

Eighth Embodiment

The above embodiment exemplifies the method of sequentially designating the modification effects. In this embodiment, a plurality of patterns in which these layout parameters are set in advance, i.e., templates, are prepared, and desired one of the templates is selected, thereby executing all effect designation processing.

FIG. 19 shows a table showing the contents of the parameters set in the respective templates. Templates 1 to 4 correspond to layout patterns 1 to 4 described above.

Figure 20:
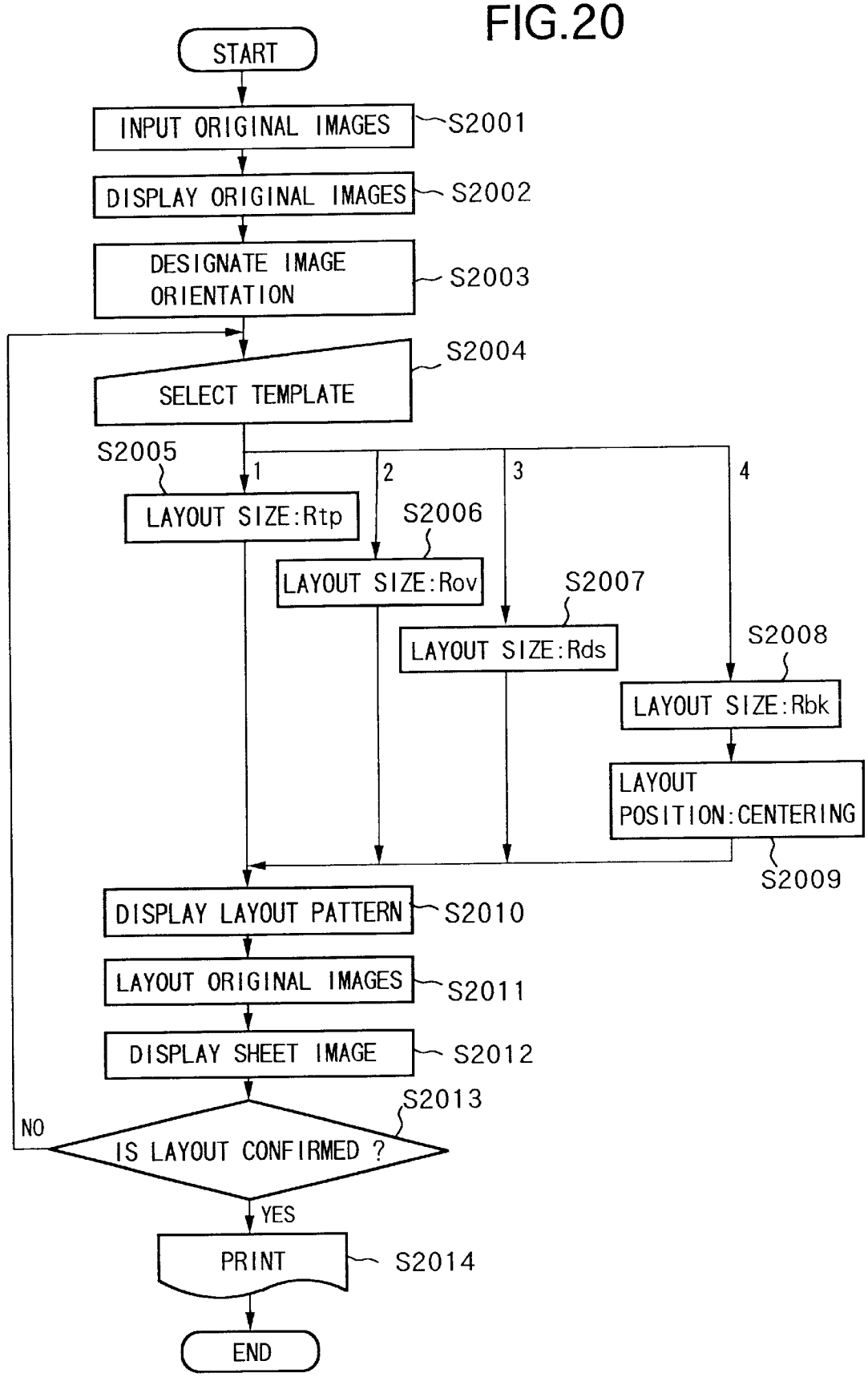
FIG. 20 is a flow chart showing the operation of the eighth embodiment.

FIG. 20 is a flow chart showing the operation of this embodiment.

Figure 18:
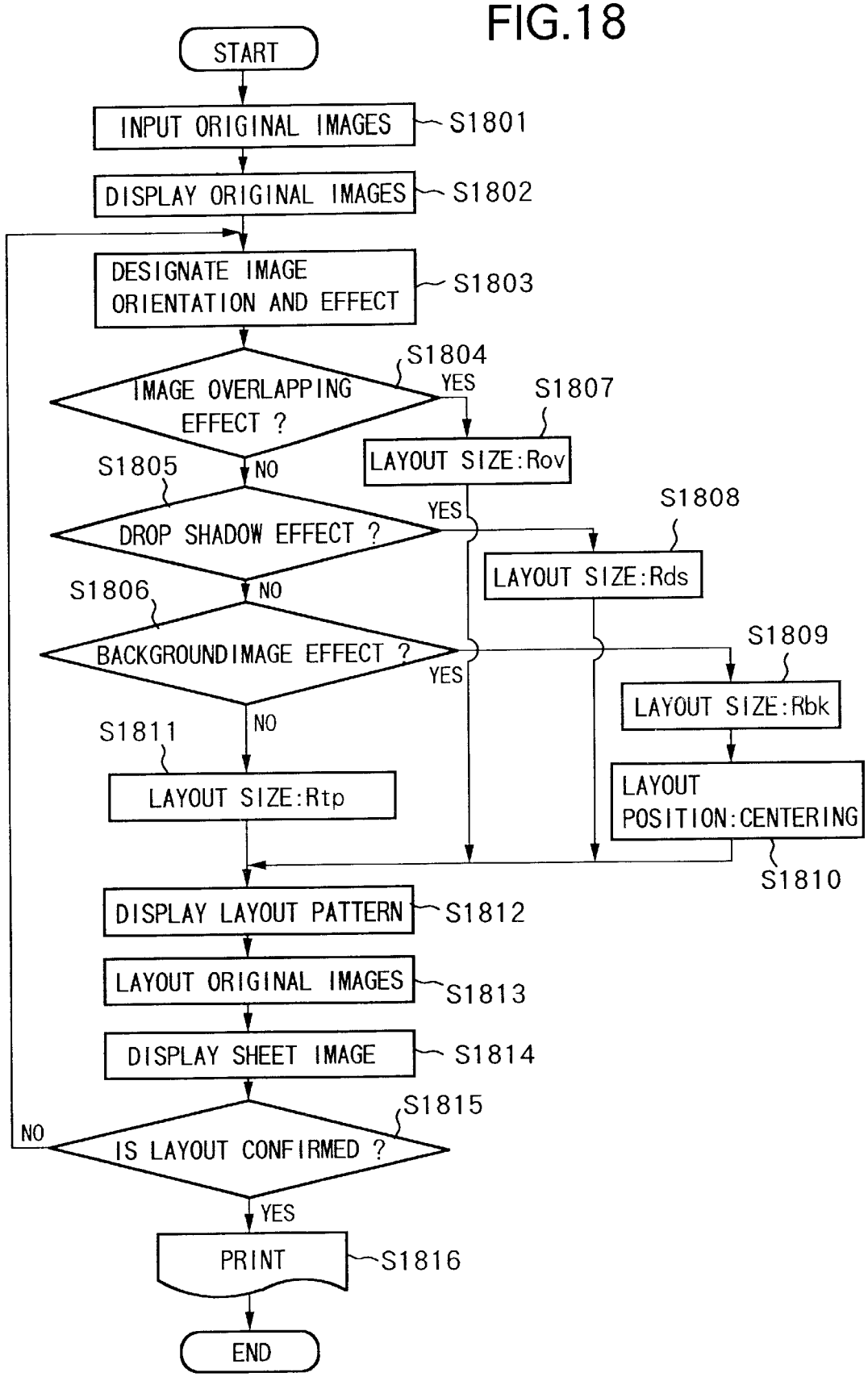
FIG. 18 is a flow chart showing the operation of the system.

Steps S2001 to S2003 are the same as steps S1801 to 1803 in FIG. 18.

In step S2004, the operator selects and designates a desired template. In steps S2005 to 2009, layout conditions, i.e., a layout size and layout positions, are set in accordance with the table shown in FIG. 19.

In this manner, patterns in which a plurality of parameters are set in advance are prepared in advance, and a desired one of the patterns is selected in this manner, thereby facilitating the operation to be performed by the operator.

As has been described above, according to this embodiment, there is provided an image editing apparatus for laying out the images input by an image input means, which includes an effect designation means for designating an arbitrary effect from at least one effect registered in advance and a condition setting means for automatically setting layout conditions for the images on the basis of the designated effect. Since the images are laid out on the basis of the layout conditions set by the condition setting means, the images can be attractively laid out without complicating the operation performed by the operator or producing any monotonous layout result.

Although several preferred embodiments of the present invention have been described above, the present invention is by no means limited to these, and various modifications and arrangements may be made without departing from the scope of the following claims.

What is claimed is:

1. An image editing apparatus for laying out a plurality of images in one page to create a composite image, comprising:

designating means for designating the plurality of images;

selection means for selecting a template for predefining an initial position of each image; and layout means for laying out the plurality of images designated by said designating means according to the template selected by said selection means, wherein said layout means adjusts the position of each image such that each of overlapped areas of the plurality of images becomes smaller than a predetermined value if at least one image of the plurality of images overlaps with one or more images adjacent to said at least one image in the layout result.

2. The apparatus according to claim 1, further comprising display means for displaying the plurality of images laid out by said layout means as the composite image.

3. The apparatus according to claim 1, further comprising means for selectively rotating an arbitrary image from among the plurality of images designated by said designating means, wherein the position of each image is adjusted in accordance with the rotated image.

4. The apparatus according to claim 1, wherein said layout means adjusts the layout between images by using at least one of image gap amounts, image gap amount deviations and image position offset amounts.

5. An image editing method of laying out a plurality of images in one page to create a composite image, comprising:

a designating step, of designating the plurality of images;

a selection step, of selecting a template for predefining an initial position of each image; and a layout step, of laying out the plurality of images designated in the designating step according to the template selected in the selection step, wherein the position of each image is adjusted in said layout step such that each of overlapped areas of the plurality of images becomes smaller than a predetermined value if at least one image of the plurality of images overlaps with one or more images adjacent to said at least one image in the layout result.

6. A medium storing a program for causing a computer to lay out a plurality of images in one page to create a composite image, wherein said computer is caused to realize:

a designating function of designating the plurality of images a selection function of selecting a template for predefining an initial position of each image; and a layout function of laying out the plurality of images designated by the designating functions according to the template selected by the selection functional, wherein the layout function adjusts the position of each image such that each of overlapped areas of the plurality of images becomes smaller than a predetermined value if at least one image of the plurality of images overlaps with one or more images adjacent to said at least one image in the layout result.

* * * * *

UNITED STATES PATENT AND TRADEMARK OFFICE
CERTIFICATE OF CORRECTION

PATENT NO. : 6,727,909 B1  Page 1 of 1
DATED : April 27, 2004
INVENTOR(S) : Koichi Matsumura et al.

It is certified that error appears in the above-identified patent and that said Letters Patent is hereby corrected as shown below:

Column 1,
Line 10, "out them" should read -- them out --.

Column 4,
Line 22, "trough" should read -- through --.

Column 9,
Line 60, "momento<=1.0" should read -- moment ( )<=1.0 --.

Column 14,
Line 50, "images" should read -- images; --;
Line 55, "functions" should read -- function --; and
Line 56, "functional," should read -- function, --.

Signed and Sealed this

Twenty-eighth Day of June, 2005

JON W. DUDAS
*Director of the United States Patent and Trademark Office*